(12) United States Patent
Froeschl

(10) Patent No.: US 9,184,624 B2
(45) Date of Patent: Nov. 10, 2015

(54) ENERGY STORAGE SYSTEM FOR SUPPLYING ELECTRICAL ENERGY TO CONSUMERS IN A VEHICLE

(75) Inventor: Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 406 days.

(21) Appl. No.: 13/446,583

(22) Filed: Apr. 13, 2012

(65) Prior Publication Data

US 2012/0194129 A1 Aug. 2, 2012

Related U.S. Application Data

(63) Continuation of application No. PCT/EP2010/064572, filed on Sep. 30, 2010.

(30) Foreign Application Priority Data

Oct. 14, 2009 (DE) .......................... 10 2009 049 321

(51) Int. Cl.
*H01M 10/44* (2006.01)
*H01M 10/46* (2006.01)
*H02J 7/34* (2006.01)
(Continued)

(52) U.S. Cl.
CPC . *H02J 7/345* (2013.01); *H02J 1/08* (2013.01); *H02J 7/1423* (2013.01); *H02J 2001/008* (2013.01); *Y02T 10/7016* (2013.01)

(58) Field of Classification Search
CPC ......... H02J 7/345; H02J 7/0052; H02J 7/007; H02J 7/04
USPC ............... 320/103, 109, 166, 167; 307/86, 66
See application file for complete search history.

(56) References Cited

U.S. PATENT DOCUMENTS 5,155,374 A * 10/1992 Shirata et al. ................ 290/38 R
6,718,927 B2 * 4/2004 Goetze et al. .............. 123/179.3
(Continued)

FOREIGN PATENT DOCUMENTS

DE 10 2007 050 587 A1 5/2008
EP 1 360 090 A1 11/2003
(Continued)

OTHER PUBLICATIONS

German Search Report dated Jun. 29, 2010 including partial English-language translation (Nine (9) pages).
(Continued)

*Primary Examiner* — Edward Tso
(74) *Attorney, Agent, or Firm* — Crowell & Moring LLP

(57) ABSTRACT

An energy storage system supplies electric energy to consuming devices in a vehicle, particularly in a motor vehicle. The system includes a first power grid having a first energy accumulator and a second power grid having a second energy accumulator, the first and second power grids being electrically coupled such that electric energy from the first power grid is feedable to the second power grid for regenerating the second energy accumulator. The energy storage system is operatively configured such that it is detected when a number of conditions has been met, the number of conditions including at least that an external charging device is connected to the first power grid for charging the first energy accumulator. In the event that the number of conditions has been met, regeneration of the second energy accumulator is carried out.

22 Claims, 2 Drawing Sheets

(51) Int. Cl.
*H02J 1/08* (2006.01)
*H02J 7/14* (2006.01)
*H02J 1/00* (2006.01)

(56) References Cited

U.S. PATENT DOCUMENTS

| | | | |
|---|---|---|---|
| 6,919,648 B2 * | 7/2005 | Bolz et al. | 290/40 C |
| 7,573,151 B2 * | 8/2009 | Acena et al. | 307/9.1 |
| 7,741,811 B2 * | 6/2010 | Daio | 320/122 |
| 7,750,607 B2 * | 7/2010 | Nakajima et al. | 320/167 |
| 7,806,095 B2 * | 10/2010 | Cook et al. | 123/179.3 |
| 2004/0112320 A1 | 6/2004 | Bolz et al. | |
| 2005/0269989 A1 * | 12/2005 | Geren et al. | 320/119 |
| 2008/0093851 A1 | 4/2008 | Maeda et al. | |
| 2008/0169791 A1 * | 7/2008 | Daio | 320/166 |
| 2009/0058371 A1 * | 3/2009 | Nakajima et al. | 320/167 |

FOREIGN PATENT DOCUMENTS

| | | |
|---|---|---|
| EP | 1 360 090 B1 | 1/2005 |
| EP | 1 130 737 B1 | 9/2009 |
| JP | 2007-143214 A | 6/2007 |
| JP | 2007-325458 A | 12/2007 |
| WO | WO 2007/104325 A1 | 9/2007 |

OTHER PUBLICATIONS

International Search Report dated Sep. 28, 2011 including English-language translation (Four (4) pages).

International Preliminary Report on Patentability dated May 8, 2012 (eight (8) pages).

* cited by examiner

ENERGY STORAGE SYSTEM FOR SUPPLYING ELECTRICAL ENERGY TO CONSUMERS IN A VEHICLE

CROSS-REFERENCE TO RELATED APPLICATIONS

This application is a continuation of PCT International Application No. PCT/EP2010/064572, filed Sep. 30, 2010, which claims priority under 35 U.S.C. §119 from German Patent Application No. DE 10 2009 049 321.2, filed Oct. 14, 2009, the entire disclosures of which are herein expressly incorporated by reference.

BACKGROUND AND SUMMARY OF THE INVENTION

The invention relates to an energy storage system for supplying electric energy to consuming devices in a vehicle, particularly in a motor vehicle, as well as to a method of regenerating an energy accumulator in such an energy storage system.

It is known to use two mutually coupled power grids with corresponding energy accumulators for each energy system for supplying electric energy to consuming devices in modern vehicles and, particularly, in automobiles. European Patent document EP 1 130 737 B1, for example, describes an electric energy supply system having a low direct-current grid and a high direct-current grid, which are mutually coupled by way of a DC-DC converter. In this case, the energy accumulators of the two grids are connected in series.

The energy accumulators of an energy storage system integrated in a vehicle and consisting of at least two energy accumulators are cyclically discharged and charged during the operation. Over a longer period of time, this leads to a deterioration of the performance of the energy accumulator or to a shortening of the useful life of the energy accumulators. Methods are therefore known from the state of the art by which an energy accumulator in an energy storage system can be regenerated in a suitable manner in order to thereby counteract the deterioration of the functionality of the energy accumulator or the shortening of its useful life.

International Patent document WO 2007/104325 A1 discloses a method of regenerating a capacitive energy accumulator in the form of a cell composite of series-connected cells consisting of double-layer capacitors. These types of energy accumulators are frequently also called supercaps and permit the accumulation of energy of a high power density. Here, it is problematic that, as a result of the cyclical charging and discharging of the cell composite, voltage drifts will occur between the individual cells which, in some cells, result in excess voltages and, in other cells, result in insufficient voltages. The regeneration described in International Patent document WO 2007/104325 A1 is based on a charging operation, which carries out a balancing of circuits of the cells, so that, by means of all cells, the same voltage is generated again. In this case, a so-called active bypass balancer circuit is used which, during the implementation of the balancing of circuits, ensures that when an excess voltage is too high in a cell, current is discharged by way of an electric resistor.

The methods known from the state of the art for regenerating an energy accumulator in an energy storage system of a vehicle have the disadvantage that impairments of the functionalities of the vehicle may occur when implementing the regeneration, particularly if the regeneration operation is started during the travel of the vehicle.

It is therefore an object of the invention to ensure in an energy storage system of a vehicle consisting of two energy accumulators that the operation of regenerating an energy accumulator is carried out without, or only with a slight, impairment of functionalities of the vehicle.

This and other objects are achieved by an energy storage system and method for supplying electric energy to consuming devices in a vehicle, particularly in a motor vehicle, comprising a first power grid having a first energy accumulator and a second power grid having a second energy accumulator. The first and the second power grid are electrically coupled such that electric energy from the first power grid can be fed to the second power grid for regenerating the second energy accumulator. The energy storage system can be operated such that it detects when a number of conditions has been met, the number of conditions comprising at least the condition that an external charging device is connected to the first power grid for charging the first energy accumulator. In the event that the number of conditions has been met, the regenerating of the second energy accumulator is carried out.

The energy storage system according to the invention comprises a first power grid having a first energy accumulator and a second power grid having a second energy accumulator, the first and the second power grid being electrically coupled—for example, by way of a converter or switch—such that electric energy from the first power grid can be fed to the second power grids for regenerating the second energy accumulator. The first power grid and second power grid preferably are direct-current grids which are mutually coupled by way of a DC-DC converter. The first and the second energy accumulator of the two power grids may be mutually connected in parallel or, if required, in series.

The energy storage system is characterized in that it can be operated such that it is detected when a number of conditions has been met, the number of conditions comprising at least the condition that an external charging device, which is not part of the energy storage system, is connected to the first power grid for charging the first energy accumulator. If the number of conditions has been met, the regeneration of the second energy accumulator will be carried out.

The invention is based on the recognition that, when a regeneration of an energy accumulator is carried out, the system functionalities of the vehicle, as a rule, will be impaired the least if the charging operation is carried out by an external charging device. The reason is that, when an external charging device is connected, usually no further functionalities or electrical consuming devices of the vehicle are used and the operation of the vehicle is therefore not impaired.

In a particularly preferred embodiment of the energy storage system according to the invention, the number of conditions, in addition to the above condition that an external charging device is connected, may comprise one or more additional conditions which can be used, for example, for making it plausible that no additional consuming devices are used which are fed by the energy storage system. In particular, the number of conditions may further comprise the condition or conditions that the vehicle is stationary, the ignition of the vehicle is switched off, and/or no condition is detected that deviates from the normal state of the second energy accumulator. The last-mentioned condition has the purpose of ensuring that no faulty operating condition of the energy accumulator is present when the regeneration is carried out, which faulty operating condition, under certain circumstances, may lead to damage to the energy accumulator. Such a condition, which deviates from the normal state of the energy accumulator, may, for example, be detected by measuring the temperature of the second energy accumulator, in which case it is determined that a condition is present that deviates from the normal state if the temperature exceeds a predetermined threshold value. In this case, the regeneration of the second energy accumulator will not be initiated.

Analogous to the above conditions, whose fulfillment starts the regenerating function for the second energy accumulator, corresponding termination conditions are also provided in a particularly preferred embodiment of the invention, in the event of whose fulfillment, the regeneration of the second energy accumulator is stopped. When carrying out the regeneration of the second energy accumulator, it is checked in this case whether at least one termination condition out of a number of termination conditions has been met.

In a variant of the invention, the termination conditions are further developed such that a termination condition will have been met if at least one of the above conditions, according to which the regeneration was started, has not been met. In particular, the number of termination conditions may comprise one or more of the following termination conditions:

(a) the external charging device is terminated by the first power grid;
(b) the ignition of the vehicle is switched on; and/or
(c) a condition is detected that deviates from the normal state of the second energy accumulator.

In a further development of the energy storage system according to the invention, the regeneration of the second energy accumulator will be terminated after it was carried out successfully. As required, the regenerating may also still be continued for a predetermined time period, particularly until a predefined state of charge of the first energy accumulator has been reached, for example, until the first energy accumulator is fully charged.

In a further development of the method according to the invention, the regeneration is based on the initially mentioned balancing of circuits of the second energy accumulator, in which case any arbitrary balancing method can be used that is known from the state of the art. In particular, the balancing of circuits takes place by an active bypass circuit in the second power grid, which was described initially. The balancing of circuits is preferably carried out based on the method described in International Patent document WO 2007/104325 A1.

In a particularly preferred embodiment of the energy storage system according to the invention, the first energy accumulator of the first power grid is a battery, particularly a 12V battery, for example, a lead battery or a nickel metal hydride battery. In this case, the first power grid preferably is the conventional on-board power system of a vehicle, by way of which the majority of the electric consuming devices of the vehicle are fed.

In a further development of the method according to the invention, the second energy capacitor of the second power grid is a capacitive energy accumulator, particularly the above-mentioned energy accumulator consisting of one or more cells of double-layer capacitors. In this case, the second power grid preferably is an expansion of the conventional on-board power supply system of the vehicle, which is used for feeding consuming devices which require a voltage deviating from the on-board power supply system or which consume a large amount of power in certain configurations and, for this purpose, require the aid of a second energy accumulator.

In a further development of the method according to the invention, the second power grid is the power grid of the electric motor of a hybrid drive which has a second energy accumulator for driving the electric motor. Since it can be assumed that the hybrid drive is not in operation when an external charging device is connected, the system functionalities of this drive are not limited thereby when the regeneration is carried out.

In addition to the above-described energy storage system, the invention relates to a method of regenerating an energy accumulator in such an energy storage system, the method being usable in combination with each variant of the above-described energy storage system. The method is thereby used in an energy storage system which comprises a first power grid having a first energy accumulator and a second power grid having a second energy accumulator, the first and second power grid being electrically coupled such that electric energy from the first power grid can be fed to the second power grid for regenerating the second energy accumulator. In this case, it is detected when a number of conditions has been met, the number of conditions comprising at least the condition that an external charging device is connected to the first power grid for charging a first energy accumulator. If required, the conditions may also comprise further conditions that were described above. In the event that the number of conditions has been met, the regenerating of the second energy accumulator is carried out, the regenerating especially being the above-described balancing of circuits. In this case, the method is preferably applied in energy storage systems in which the second energy accumulator is a capacitive energy accumulator, particularly a cell composite consisting of one or more cells of double-layer capacitors.

In addition to the above-described energy storage system and method, the invention also relates to a vehicle, particularly a motor vehicle, that includes the energy storage system according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
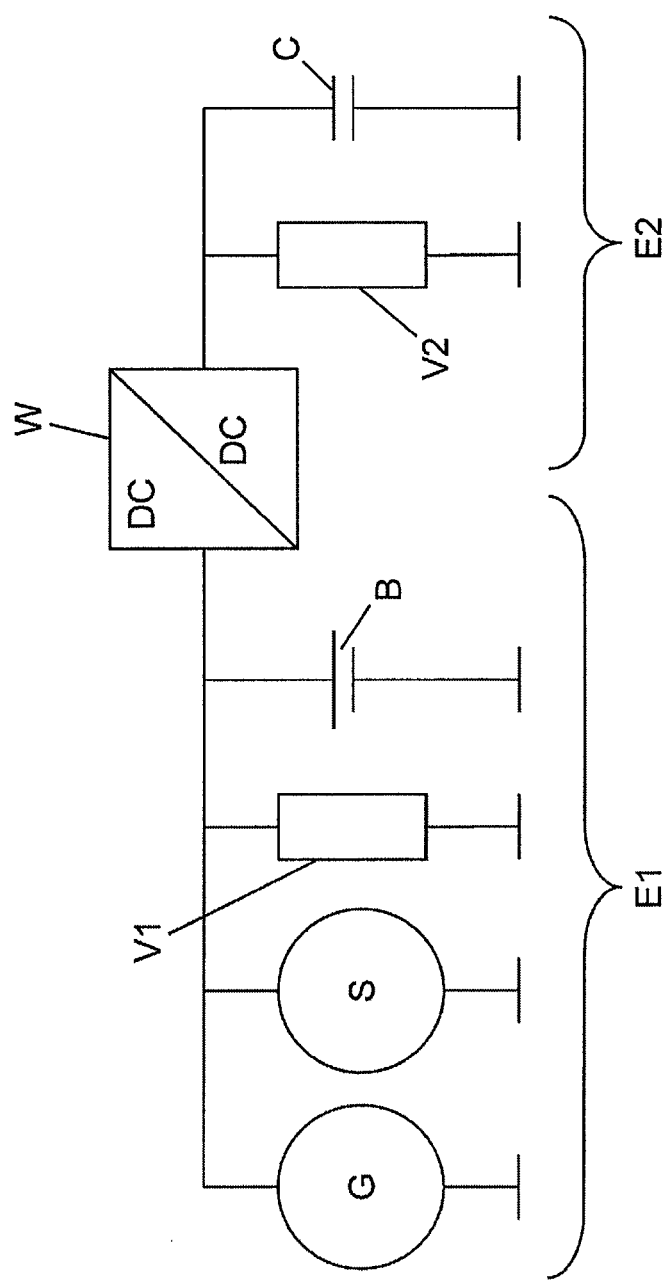
FIG. 1 is a schematic representation of an embodiment of an energy storage system according to the invention in a motor vehicle.

FIG. 1 illustrates an embodiment of an electric energy storage system in a motor vehicle, which has a first power grid E1 and a second power grid E2.

In this case, the power grid E1 represents a conventional on-board power supply system of the motor vehicle and includes a generator G in the form of a dynamo, a starter S, a plurality of consuming devices (i.e., loads), which are schematically outlined by the reference symbol V1, as well as an electric energy accumulator (also known as an energy store) in the form of a 12V battery, such as a lead battery or an NiMH battery (NiMH=nickel metal hydride). The on-board power supply system E1 is connected by way of a DC-DC current converter W with the additional second power grid E2, which, in the embodiment of FIG. 1, represents an expansion of the on-board power supply system E1. This power grid E2 includes a capacitive energy accumulator C and feeds additional consuming devices which are schematically indicated by the reference symbol V2.

The consuming devices V1 are conventional consuming devices that are to be electrically driven in a motor vehicle, such as a radio, a navigation system, an electrical seat adjustment system and the like. The power grid E2 can be operated with the same or with a different direct voltage as the on-board power supply system E1. The power grid E2 may, for example, be a 24V direct-current grid. Consuming devices V2 hang on the power grid E2, which consuming devices V2 require a higher voltage supply than the consuming devices V1 of the on-board power system E1 (or consume a large amount of power in certain operating situations which can no longer be made available by way of the converter from the on-board power supply system E1). One example of a consuming device V2 is an electric steering system which, in the case of certain operations, for example, when parking the vehicle in a parking space, consumes a large amount of power. For such power consumption peaks, the capacitive energy accumulator C is provided in the power grid E2, which capacitive energy accumulator C is further developed as an arrangement consisting of a plurality of cells of double-layer capacitors, which usually are also called supercaps.

The energy accumulator C is charged by the coupling to the first power grid E1 by way of the DC-DC converter W.

Energy accumulators in the form of supercaps have the characteristic that the individual voltages of the series-connected capacitive cells drift apart as a result of cyclical charging and discharging which, over a longer period of time, worsens the performance of the supercap or reduces the service life of the supercap. A regenerating operation of the energy accumulator C therefore should be carried out at regular intervals, for example, twice to five times a year, during which the individual cells of the energy accumulator are balanced by a corresponding charging operation, so that all cells essentially provide the same voltage again. As mentioned above, the balancing of energy accumulators is known per se from the state of the art and, in the embodiment described here, a balancing by way of an active bypass balancer circuit is used, which, in the event of excessive voltage in a cell, discharges current by way of an electric resistor.

The balancing operation is normally carried out at regular intervals by way of the activation of the regenerating function in the converter W, the regenerating operation not being coupled to special criteria of the vehicle operation. System functions of the vehicle may therefore be impaired during the regenerating operation, particularly if the regenerating operation is initiated or carried out during the drive of the vehicle. The energy storage system of FIG. 1 avoids these problems in that the start of the regenerating operation is coupled with the connection of an external charging device to the first power grid E1, which will be explained in the following by means of FIG. 2.

Figure 2:
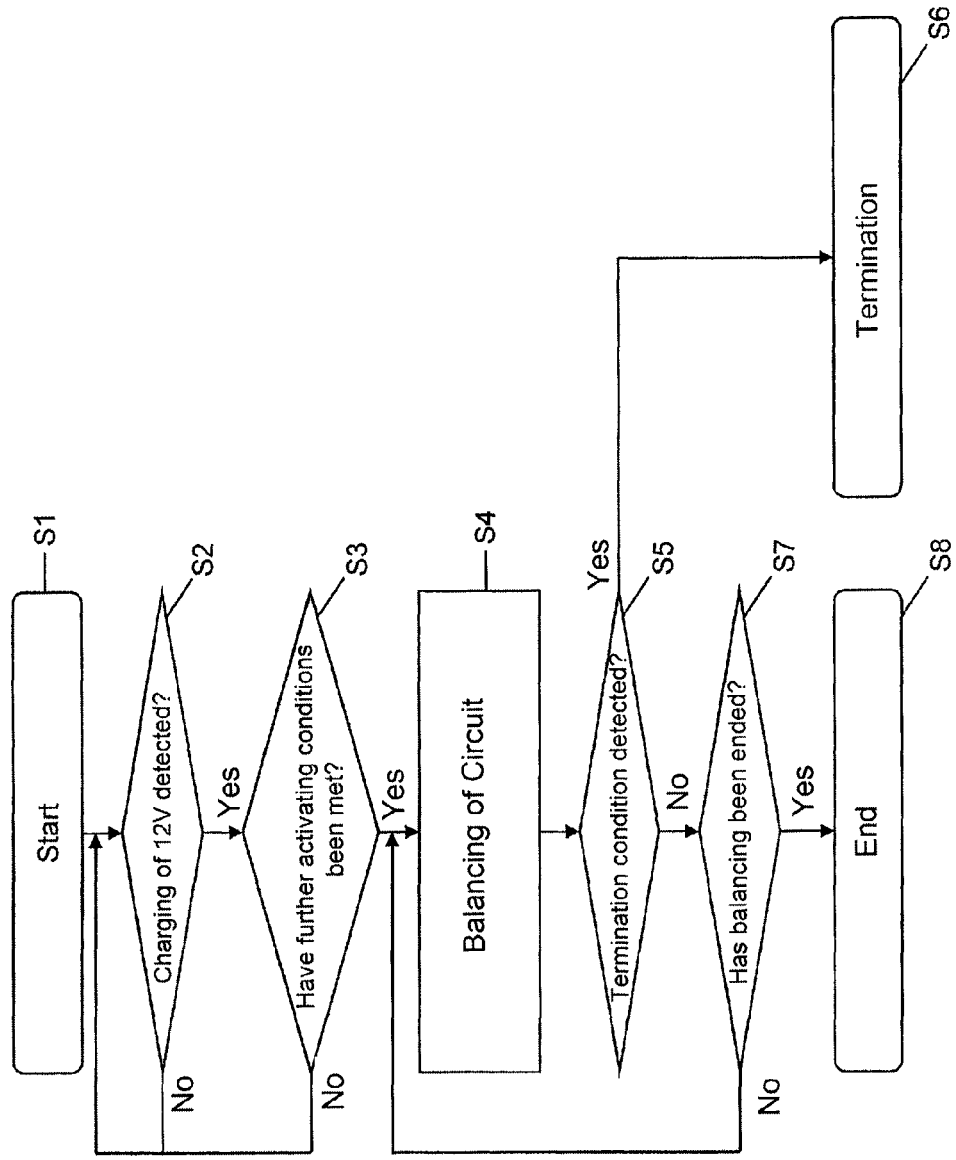
FIG. 2 is a schematic representation of the course of the regeneration of an energy accumulator in the energy storage system of FIG. 1.

FIG. 2 illustrates the method steps which are carried out in the energy storage system of FIG. 1 during the balancing of the energy accumulator C. The method starts in Step S1 with the start of a detection function which checks the energy storage system to see whether the battery B is being recharged by way of an externally connected charging device (Step S2). If this is so, in Step S3 further activating conditions that have to be met in order to cause the balancing of the second energy accumulator C are checked. These further activating conditions represent protective mechanisms which ensure that the vehicle is in a state in which no functional impairment occurs by the balancing, or which guarantee that the balancing does not result in damage to the second energy accumulator or to consuming devices in the vehicle. In a preferred embodiment, the further activating conditions include the condition that the vehicle is stationary and that the ignition of the vehicle is switched off. As a result, it is plausibly determined that the vehicle is in an inactive condition, in which no system functionalities are utilized. A further activating condition may, for example, be that the temperature of the energy accumulator C is below a threshold value. When the threshold value is exceeded, it is highly probable that there is a malfunctioning of the energy accumulator C which, under certain circumstances, may result in damage to the energy accumulator during the balancing.

The balancing of the circuits will be initiated in Step S4 only if the connection to the external charging device is detected and the further activating conditions are present. As a result of the balancing, voltage differences in the individual cells of the supercap will be compensated. As mentioned above, the method described in International Patent document WO 2007/104325 A1 is preferably used for the balancing of circuits. However, as required, other balancing methods may also be used. The balancing of circuits normally takes place such that, for the compensation of voltage differences in the individual cells, a slight overcharging of the cells is carried out as a function of the state of the cells, or electric energy is transferred from one cell into the other. By means of the above-mentioned active bypass circuit, an excessive charging of the individual cells will be prevented.

During the implementation of the balancing in Step S4, it is checked at regular intervals whether a termination condition is present from a plurality of termination conditions (Step S5). In this case, the plurality of termination conditions include at least the condition that the external charging device is terminated by the first power grid E1. This means that, if this condition is present, the balancing will be ended because the termination of the charging device indicates that further functions of the vehicle are activated which could be impaired by the balancing. The plurality of termination conditions may, for example, also include the additional condition that the ignition of the vehicle is switched on, because it should also be assumed in this case that the operation of additional functions of the vehicle is started. An additional termination condition may, for example, be the exceeding of a threshold temperature in the supercap C. Analogous to the activating conditions, the termination conditions can therefore be further developed such that an absence of an activating condition corresponds to a termination condition. In this case, in contrast to the activating conditions, as a rule, even the presence of a termination condition already leads to a stoppage of the balancing. In FIG. 2, this is indicated in Step S6. Should no termination condition be detected in Step S5, the balancing will be continued, in which case, it is checked at regular intervals whether the balancing could be ended successfully (Step S7). If this is so, the process ends in Step S8. In a variant of the invention, there is also the possibility that, after a successful balancing, the charging operation for the regeneration will be continued for a predetermined time, for example, as a function of the state of charge of the battery B or the grid state of the power grid E1. The balancing can, for example, be continued until the battery B is fully charged by way of the charging device.

By means of the embodiment of the method according to the invention described above, the balancing of an energy accumulator in a motor vehicle energy storage system consisting of two energy accumulators is at least coupled to the criterion that a first energy accumulator is charged by an external charging device. The charging by way of an external charging device occurs particularly when the vehicle owner presents his vehicle for an inspection. The vehicle will then not be in the customary operating state, so that a balancing of a second energy accumulator can be carried out without impairing vehicle functionalities.

As required, for the purpose of making plausibility determinations, additional conditions for activating the balancing can also be taken into account, as explained above.

The method was described in FIG. 1 by way of a conventional on-board power supply system E1 with a corresponding on-board power supply expansion E2. However, the method can also be used for arbitrary other energy storage systems in a vehicle. For example, the power grid E2 may be the power grid of a hybrid drive in a vehicle, the consuming device V2 in this case being the electric motor of the hybrid drive which is operated by way of a suitable second energy accumulator. For balancing the second energy accumulator, in this case, energy from the on-board power supply system E1 is again fed by way of a corresponding DC-DC converter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage system for supplying electric energy to consuming devices in a vehicle, the energy storage system comprising:
    a first power grid having a first energy accumulator;
    a second power grid having a second energy accumulator, the first and second power grids being electrically coupled such that electric energy from the first power grid is feedable to the second power grid for regenerating the second energy accumulator; and
    wherein the energy storage system is operatively configured to detect when a number of conditions have been met, said number of conditions comprising at least a condition that an external charging device is coupled to the first power grid for charging the first energy accumulator, and only in an event that the number of conditions have been met, regenerating of the second energy accumulator is carried out.

2. The energy storage system according to claim 1, wherein the number of conditions further comprises at least one of:
    the vehicle being stationary;
    an ignition of the vehicle being switched off; and
    no condition being detected that deviates from a normal state of the second energy accumulator.

3. The energy storage system according to claim 1, wherein when carrying out the regenerating of the second energy accumulator, the energy storage system determines whether at least one termination condition out of a number of termination conditions has been met, the regenerating being stopped when the at least one termination condition has been met.

4. The energy storage system according to claim 3, wherein the number of termination conditions comprises at least one of:
    the external charging device being terminated by the first power grid;
    an ignition of the vehicle being switched on; and
    a condition being detected that deviates from a normal state of the second energy accumulator.

5. The energy storage system according to claim 2, wherein when carrying out the regenerating of the second energy accumulator, the energy storage system determines whether at least one termination condition out of a number of termination conditions has been met, the regenerating being stopped when the at least one termination condition has been met.

6. The energy storage system according to claim 5, wherein the number of termination conditions comprises at least one of:
    the external charging device being terminated by the first power grid;
    an ignition of the vehicle being switched on; and
    a condition being detected that deviates from a normal state of the second energy accumulator.

7. The energy storage system according to claim 1, wherein the regenerating of the second energy accumulator ends after a successful implementation or continues for a predetermined time period until a predetermined charge state of the first energy accumulator is reached.

8. The energy storage system according to claim 1, wherein the regenerating of the second energy accumulator is a balancing of the second energy accumulator, said balancing occurring via an active bypass circuit in the second power grid.

9. The energy storage system according to claim 1, wherein the first and second power grids are direct-current grids.

10. The energy storage system according to claim 9, wherein the direct-current grids are mutually coupled via a DC-DC converter.

11. The energy storage system according to claim 1, wherein the first energy accumulator is a battery.

12. The energy storage system according to claim 1, wherein the second energy accumulator is a capacitive energy accumulator.

13. The energy storage system according to claim 1, wherein the first energy accumulator is a battery and the second energy accumulator is a capacitive energy accumulator.

14. The energy storage system according to claim 13, wherein the battery is a 12V battery and the capacitive energy accumulator comprises one or more cells of double-layer capacitors.

15. The energy storage system according to claim 1, wherein the second power grid is a power grid of an electric motor of a hybrid drive of the vehicle, the second power grid having the second energy accumulator drive the electric motor.

16. A method of operating an energy storage system for supplying electric energy to consuming devices in a vehicle, the energy storage system having a first power grid including a first energy accumulator and a second power grid including a second energy accumulator, the first and second power grids being electrically coupled such that electric energy from the first power grid is feedable to the second power grid for regenerating the second energy accumulator, the method of operating the energy storage system comprising the acts of:
    detecting one or more conditions to be met for regenerating the second energy accumulator, one of said one or more conditions being a connection of an external charging device to the first power grid for charging the first energy accumulator; and
    regenerating the second energy accumulator only when the detected one or more conditions have been met.

17. The method according to claim 16, wherein the detecting of the one or more conditions further comprises the acts of:
    detecting if the vehicle is stationary;
    detecting if an ignition is of the vehicle is switched-off; and
    determining that no condition is detected that deviates from a normal state of the second energy accumulator.

18. The method according to claim 16, further comprising the acts of:
- during the regeneration of the second energy accumulator, determining whether at least one termination condition of a number of termination conditions have been met; and
- stopping the regeneration of the second energy accumulator when the at least one termination condition has been met.

19. The method according to claim 18, wherein the act of detecting the at least one termination condition further comprises the acts of:
- detecting whether the external charging device is terminated by the first power grid;
- detecting whether the ignition of the vehicle is switched-on; and
- detecting a condition that deviates from a normal state of the second energy accumulator.

20. The method according to claim 17, further comprising the acts of:
- during the regeneration of the second energy accumulator, determining whether at least one termination condition of a number of termination conditions have been met; and
- stopping the regeneration of the second energy accumulator when the at least one termination condition has been met.

21. A vehicle, comprising:
an energy storage system for supplying electric energy to consuming devices in a vehicle comprising:
- a first power grid having a first energy accumulator;
- a second power grid having a second energy accumulator, the first and second power grids being electrically coupled such that electric energy from the first power grid is feedable to the second power grid for regenerating the second energy accumulator;

wherein the energy storage system is operatively configured to detect when a number of conditions have been met, said number of conditions comprising at least a condition that an external charging device is coupled to the first power grid for charging the first energy accumulator, and only in an event that the number of conditions have been met, regenerating of the second energy accumulator is carried out.

22. The vehicle according to claim 21, wherein the vehicle is a motor vehicle.

* * * * *